(12) United States Patent
Choi et al.

(10) Patent No.: US 9,494,723 B2
(45) Date of Patent: Nov. 15, 2016

(54) DISPLAY DEVICE

(71) Applicant: LG INNOTEK CO LTD., Seoul (KR)

(72) Inventors: Gwang Hei Choi, Seoul (KR); Soung Kyu Park, Seoul (KR); Jeong Taek Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/362,838

(22) PCT Filed: Nov. 23, 2012

(86) PCT No.: PCT/KR2012/009995
§ 371 (c)(1),
(2) Date: Jun. 4, 2014

(87) PCT Pub. No.: WO2013/085187
PCT Pub. Date: Jun. 13, 2013

(65) Prior Publication Data
US 2014/0307465 A1    Oct. 16, 2014

(30) Foreign Application Priority Data
Dec. 8, 2011 (KR) .................. 10-2011-0131365

(51) Int. Cl.
*F21V 8/00* (2006.01)
*G02F 1/1335* (2006.01)
(52) U.S. Cl.
CPC ............ *G02B 6/0041* (2013.01); *G02B 6/0036* (2013.01); *G02B 6/0043* (2013.01); *G02F 1/133615* (2013.01)
(58) Field of Classification Search
CPC  G02B 6/0041; G02B 6/0043; G02B 6/0036; G02B 6/0038; G02B 6/0053; G02B 6/0068; G02B 6/0061; G02B 6/0031; G02F 1/133615; G02F 1/133606
USPC ................. 362/600, 606–607, 615, 617, 628
See application file for complete search history.

(56) References Cited

U.S. PATENT DOCUMENTS 7,393,130 B2 *  7/2008  Hasei ........................... 362/619
8,434,909 B2 *  5/2013  Nichol et al. ............ 362/296.01
2002/0018632 A1  2/2002  Pelka
(Continued)

FOREIGN PATENT DOCUMENTS

CN          2496052 Y      6/2002
CN          2586980 Y      11/2003
(Continued)

OTHER PUBLICATIONS

Taiwanese Office Action dated Mar. 30, 2015 issued in Application No. 101145016 (Original Office Action with English Translation).
(Continued)

*Primary Examiner* — Anne Hines
*Assistant Examiner* — Jose M Diaz
(74) *Attorney, Agent, or Firm* — KED & Associates, LLP

(57) ABSTRACT

Disclosed is a display device. The display device includes: a light source; a light guide plate into which light is incident from the light source; a light conversion member on the light guide plate; and a display panel on the light conversion member, wherein a plurality of scattering parts having a diameter in a range of 90 μm to 300 μm are provided in the light guide plate.

11 Claims, 4 Drawing Sheets

(56) References Cited

U.S. PATENT DOCUMENTS

| | | | |
|---|---|---|---|
| 2004/0184257 A1* | 9/2004 | Huang | 362/31 |
| 2005/0105282 A1* | 5/2005 | Yu et al. | 362/31 |
| 2005/0110196 A1* | 5/2005 | Yu et al. | 264/328.1 |
| 2005/0117320 A1* | 6/2005 | Leu et al. | 362/31 |
| 2005/0190579 A1 | 9/2005 | Lin | |
| 2006/0018623 A1* | 1/2006 | Yu et al. | 385/146 |
| 2006/0044834 A1* | 3/2006 | Yu | 362/620 |
| 2006/0127030 A1* | 6/2006 | Yu et al. | 385/146 |
| 2006/0146562 A1 | 7/2006 | Ko et al. | |
| 2007/0258268 A1 | 11/2007 | Kim et al. | 362/627 |
| 2008/0137328 A1 | 6/2008 | Lee et al. | 362/224 |
| 2008/0302977 A1 | 12/2008 | Yao et al. | |
| 2009/0122227 A1 | 5/2009 | Hong et al. | 349/64 |
| 2009/0129055 A1* | 5/2009 | Morizawa | C09K 11/7731 362/97.1 |
| 2009/0180055 A1* | 7/2009 | Kim et al. | 349/69 |
| 2010/0014316 A1 | 1/2010 | Yue | |
| 2010/0110336 A1 | 5/2010 | Lin et al. | 349/64 |
| 2010/0259830 A1* | 10/2010 | Yu | 359/619 |
| 2010/0270692 A1* | 10/2010 | Yu | 264/1.38 |
| 2010/0271840 A1* | 10/2010 | Hamada | G02B 5/0242 362/606 |
| 2010/0321953 A1* | 12/2010 | Coleman et al. | 362/607 |
| 2011/0013868 A1* | 1/2011 | Suzumura | G02B 6/0001 385/32 |
| 2011/0255303 A1* | 10/2011 | Nichol et al. | 362/606 |
| 2012/0092891 A1* | 4/2012 | Nakagome et al. | 362/607 |
| 2012/0105769 A1* | 5/2012 | Fukuda | B29D 11/00798 349/64 |
| 2012/0113672 A1* | 5/2012 | Dubrow et al. | 362/602 |
| 2012/0235891 A1* | 9/2012 | Nishitani et al. | 345/102 |
| 2012/0236403 A1* | 9/2012 | Sykora et al. | 359/463 |
| 2012/0275188 A1* | 11/2012 | Kurimoto et al. | 362/608 |
| 2013/0033901 A1* | 2/2013 | Nishitani et al. | 362/613 |
| 2013/0100697 A1* | 4/2013 | Yu et al. | 362/608 |
| 2013/0121016 A1* | 5/2013 | Kim et al. | 362/600 |
| 2013/0301135 A1* | 11/2013 | Nishimura | G02B 5/0294 359/599 |
| 2014/0233212 A1* | 8/2014 | Park | 362/84 |

FOREIGN PATENT DOCUMENTS

| | | |
|---|---|---|
| CN | 2588387 Y | 11/2003 |
| CN | 1617020 | 5/2005 |
| CN | 101118043 | 2/2008 |
| CN | 101349776 | 1/2009 |
| CN | 101614839 A | 12/2009 |
| CN | 101634726 | 1/2010 |
| CN | 101685180 A | 3/2010 |
| KR | 10-2008-0052502 A | 6/2008 |
| KR | 10-2009-0048383 A | 5/2009 |
| KR | 10-2009-0054415 A | 5/2009 |
| KR | 10-2009-0078547 A | 7/2009 |
| KR | 10-2010-0042216 A | 4/2010 |
| KR | 10-2011-0022970 A | 3/2011 |
| TW | 200516318 A | 5/2005 |
| TW | 200619755 A | 6/2006 |
| TW | 200817777 A | 4/2008 |
| TW | M341811 U | 10/2008 |
| TW | 201019002 A | 5/2010 |
| TW | 201128245 A | 8/2011 |
| TW | 201142436 A | 12/2011 |
| WO | WO 01/66997 A2 | 9/2001 |
| WO | WO 2011129117 A1 * | 10/2011 |

OTHER PUBLICATIONS

European Search Report dated Jul. 3, 2015 issued in Application No. 12856122.2.
European Search Report dated Oct. 20, 2015 issued in Application No. 12856122.2.
Korean Office Action dated Feb. 3, 2016 issued in Application No. 10-2011-0131365.
Chinese Office Action dated May 5, 2016 issued in Application No. 201280068353.4 (with English translation).

* cited by examiner

DISPLAY DEVICE

CROSS-REFERENCE TO RELATED PATENT APPLICATIONS

This application is a U.S National Stage Application under 35 U.S.C. §371 of PCT Application No. PCT/KR2012/009995, filed Nov. 23, 2012, which claims priority to Korean Patent Application No. 10-2011-0131365, filed Dec. 8, 2011, whose entire disclosures are hereby incorporated by reference.

TECHNICAL FIELD

The embodiment relates to an optical member and a display device having the same.

BACKGROUND ART

Recently, flat display devices, such as an LCD (liquid crystal display), a PDA (plasma display panel) or an OLED (organic light emitting diode), have been increasingly developed instead of conventional CRTs (cathode ray tubes).

Among them, the LCD includes a liquid crystal display panel having a thin film transistor substrate, a color filter substrate and a liquid crystal injected between the thin film transistor substrate and the color filter substrate. Since the liquid crystal display panel is a non-emissive device, a backlight unit is provided below the thin film transistor substrate to supply light. Transmittance of the light emitted from the backlight unit is adjusted according to the alignment state of the liquid crystal.

The backlight unit is classified into an edge-illumination type backlight unit and a direct-illumination type backlight unit according to the position of a light source. According to the edge-illumination type backlight unit, the light source is located at a side of a light guide plate.

The direct-illumination type backlight unit has been developed as the size of the LCD has become enlarged. According to the direct-illumination type backlight unit, at least one light source is located below the liquid crystal display panel to supply the light over the whole area of the liquid crystal display panel.

When comparing with the edge-illumination type backlight unit, the direct-illumination type backlight unit can employ a large number of light sources so that the high brightness can be achieved. In contrast, the direct-illumination type backlight unit must have thickness larger than thickness of the edge-illumination type backlight unit in order to ensure brightness uniformity.

In order to solve the above problem, a quantum dot bar having a plurality of quantum dots, which can convert blue light into red light or green light, is positioned in front of a blue LED that emits the blue light. Thus, as the blue light is irradiated onto the quantum dot bar, the blue light, the red light and the green light are mixed with each other by the quantum dots distributed in the quantum dot bar and the mixed light is incident into the light guide plate, so that white light is generated.

If the white light is supplied to the light guide plate by using the quantum dot bar, high color reproduction may be realized.

The backlight unit may include an FPCB (flexible printed circuit board) provided at one side of the blue LED, which generates blue light, to supply signals and power to the LED and a bonding member formed under the bottom surface of the FPCB.

The display device capable of displaying various images using the white light supplied to the light guide plate through the quantum dot bar as the blue light is emitted from the blue LED has been extensively used.

The display device employing the quantum dots is disclosed in Korean Unexamined Patent Publication No. 10-2011-0068110.

DISCLOSURE OF INVENTION

Technical Problem

The embodiment provides a display device representing improved brightness.

Solution to Problem

According to the embodiment, there is provided a display device including: a light source; a light guide plate into which light is incident from the light source; a light conversion member on the light guide plate; and a display panel on the light conversion member, wherein a plurality of scattering parts having a diameter in a range of 90 μm to 300 μm are provided in the light guide plate.

According to the embodiment, there is provided a display device including a light guide plate; a light source in a side of the light guide plate; a light conversion sheet on the light guide plate, and a display panel on the light conversion sheet, wherein the light guide plate comprises scattering parts having a diameter in a range of 90 μm to 300 μm.

Advantageous Effects of Invention

In the display device according to the embodiment, the light conversion member is provided on the light guide plate, and the scattering parts have a large diameter in the range of 90 μm to 300 μm. In this case, the light conversion member includes light conversion particles. The light conversion particles can randomly change a light path while converting a wavelength of incident light. That is, the light conversion particles can perform a scattering function.

Accordingly, even if the scattering parts have a large diameter, the light conversion member has a scattering function so that the brightness uniformity is not reduced.

Consequently, the scattering parts have a large diameter so that the brightness can be improved.

As a result, the display device according to the embodiment can represent improved brightness without reducing brightness uniformity.

MODE FOR THE INVENTION

Figure 1:
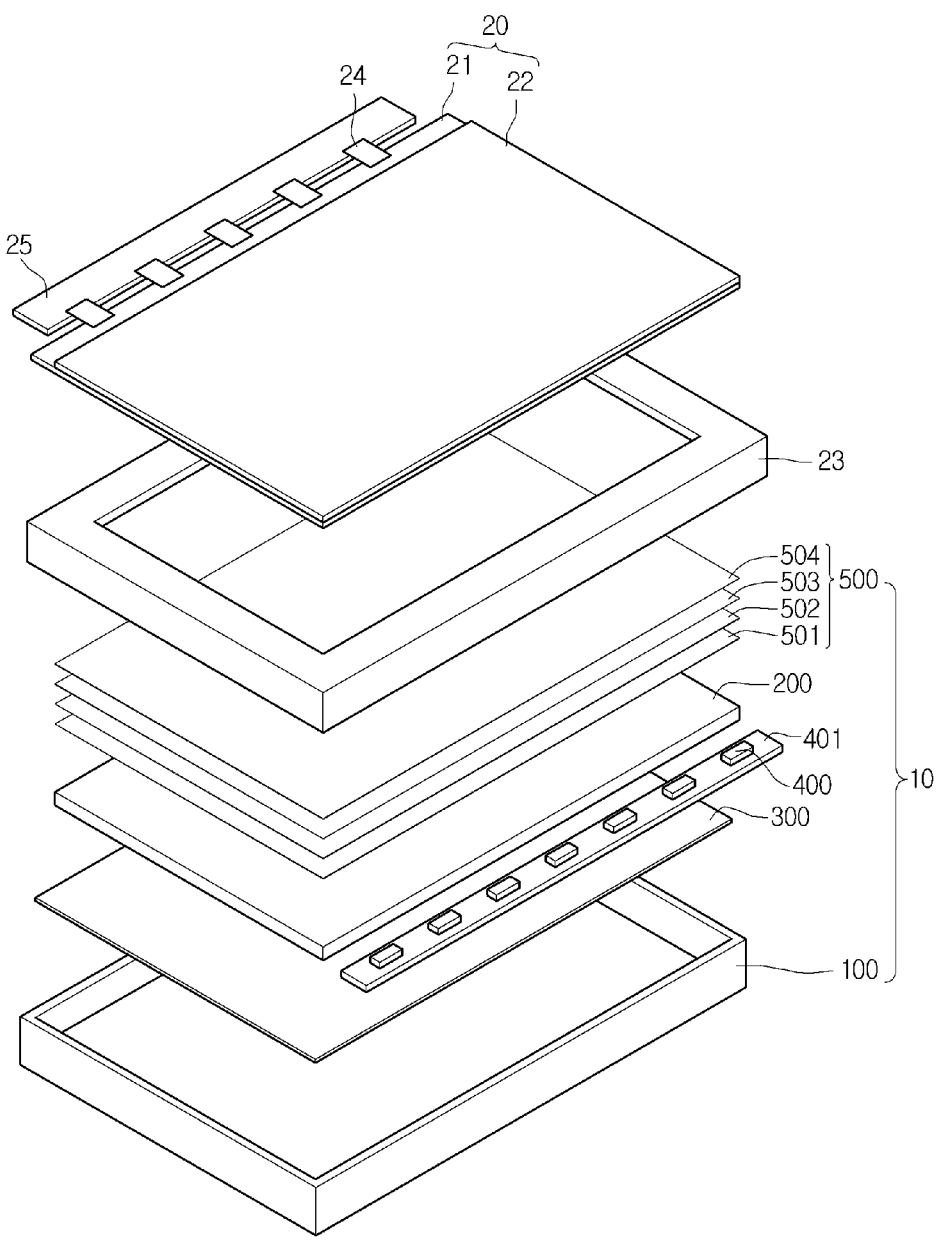
FIG. 1 is an exploded perspective view showing a liquid crystal display according to the embodiment.

In the description of the embodiments, it will be understood that, when a substrate, a frame, a sheet, a layer, or a pattern is referred to as being "on" or "under" another substrate, another frame, another sheet, another layer, or another pattern, it can be "directly" or "indirectly" on the other substrate, frame, sheet, layer, or pattern, one or more intervening layers may also be present. Such a position of each element has been described with reference to the drawings. The thickness and size of each element shown in the drawings may be exaggerated, omitted or schematically drawn for the purpose of convenience or clarity. In addition, the size of elements does not utterly reflect an actual size.

Figure 2:
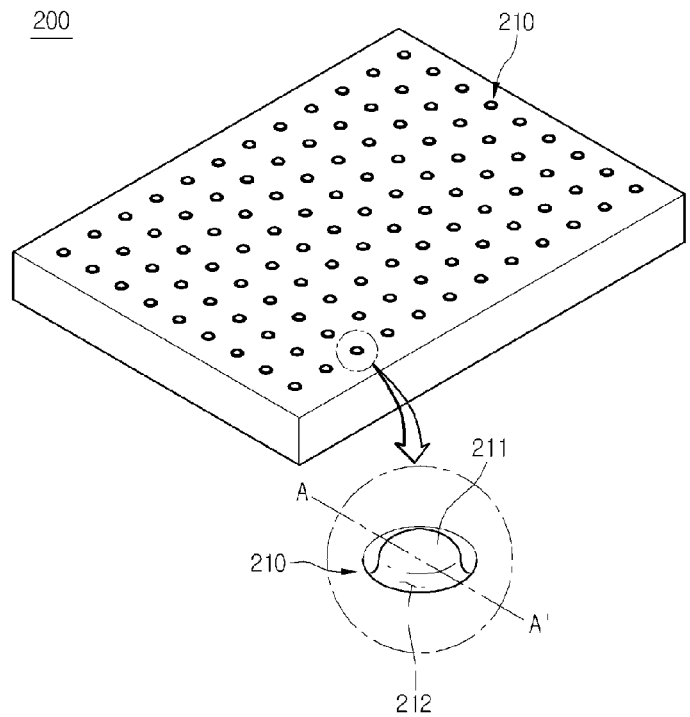
FIG. 2 is a perspective view showing a light guide plate.
Figure 3:
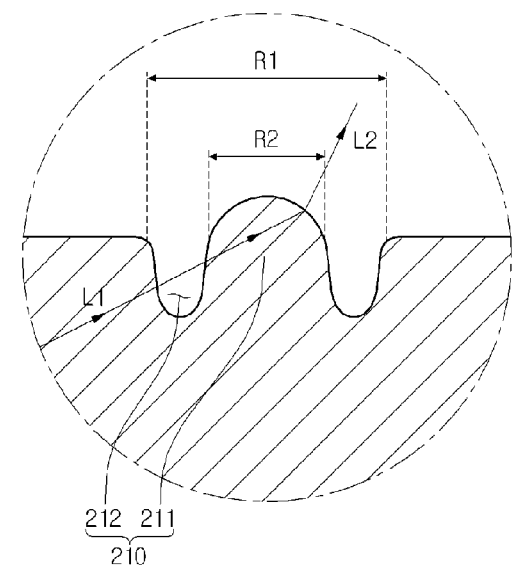
FIG. 3 is a sectional view taken along line A-A' of FIG. 2.
Figure 4:
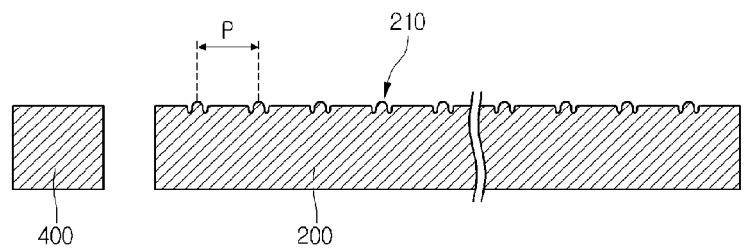
FIG. 4 is a sectional view showing the light guide plate.
Figure 5:
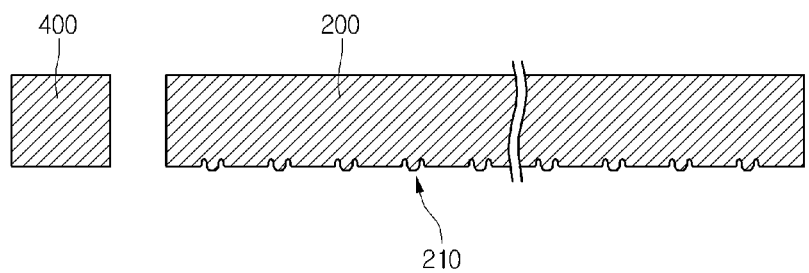
FIG. 5 is a sectional view showing a light guide plate according to another embodiment.
Figure 6:
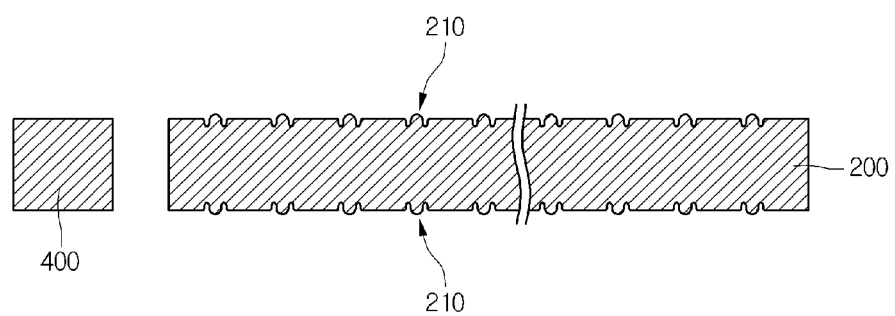
FIG. 6 is a sectional view showing a light guide plate according to still another embodiment.
Figure 7:
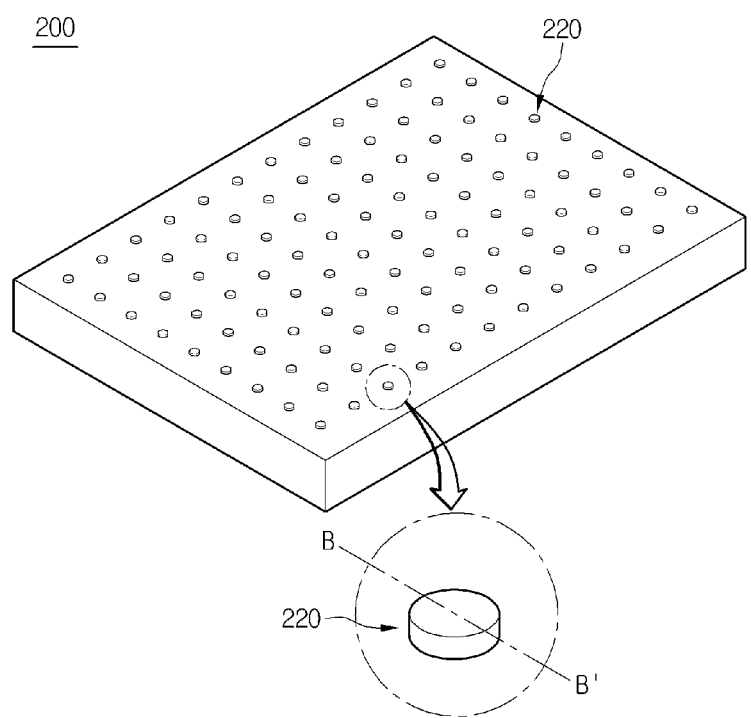
FIG. 7 is a perspective view showing the light guide plate according to still another embodiment.
Figure 8:
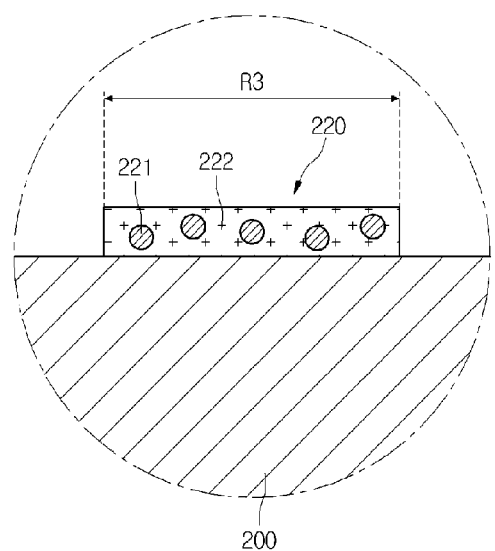
FIG. 8 is a sectional view taken along line B-B' of FIG. 7.
Figure 9:
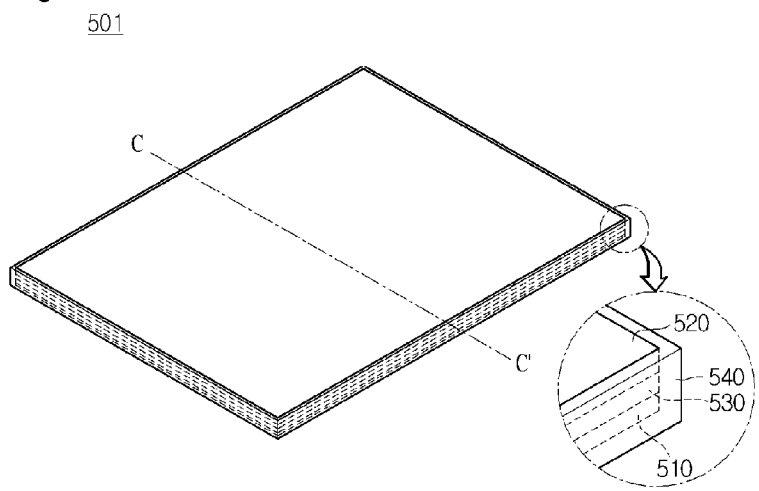
FIG. 9 is a perspective view showing a light conversion sheet according to the embodiment.
Figure 10:
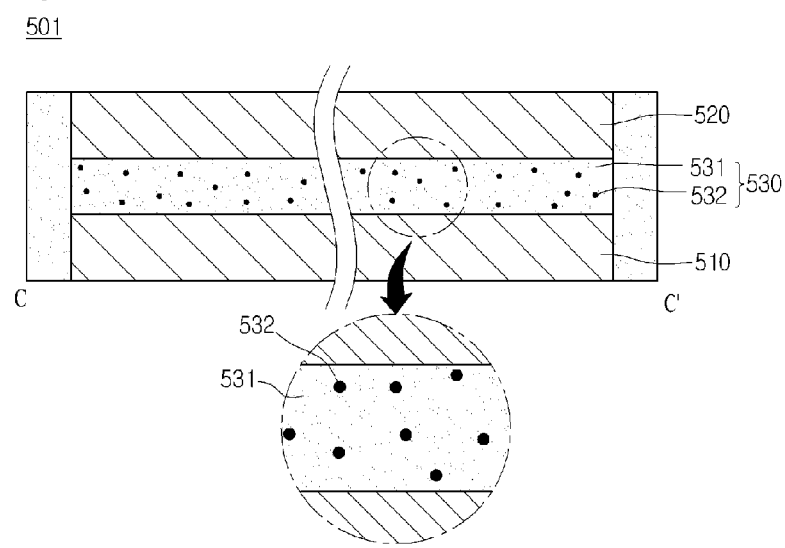
FIG. 10 is a sectional view taken along line C-C' of FIG. 9.

FIG. 1 is an exploded perspective view showing a liquid crystal display according to the embodiment. FIG. 2 is a perspective view showing a light guide plate. FIG. 3 is a sectional view taken along line A-A' of FIG. 2. FIG. 4 is a sectional view showing the light guide plate. FIG. 5 is a sectional view showing a light guide plate according to another embodiment. FIG. 6 is a sectional view showing a light guide plate according to still another embodiment. FIG. 7 is a perspective view showing the light guide plate according to still another embodiment. FIG. 8 is a sectional view taken along line B-B' of FIG. 7. FIG. 9 is a perspective view showing a light conversion sheet according to the embodiment. FIG. 10 is a sectional view taken along line C-C' of FIG. 9.

Referring to FIGS. 1 to 10, the liquid crystal display according to the embodiment includes a backlight unit 10 and a liquid crystal panel 20.

The backlight unit 10 supplies light to the liquid crystal panel 30. The backlight unit 10 serves as a surface light source so that the light can be uniformly supplied to a bottom surface of the liquid crystal panel 20.

The backlight unit 10 is disposed below the liquid crystal panel 20. The backlight unit 10 includes a bottom cover 100, a reflective sheet 300, a light source, for example, a plurality of light emitting diodes 400, a printed circuit board 401, a light guide plate 200, and a plurality of optical sheets 500.

An upper portion of the bottom cover 100 is open. The bottom cover 100 receives the light guide plate 200, the light emitting diodes 400, the printed circuit board 401, the reflective sheet 300, and the optical sheets 500 therein.

The reflective sheet 201 is disposed below the light guide plate 200. In more detail, the reflective sheet 300 is disposed between the light guide plate 200 and a bottom surface of the bottom cover 100. The reflective sheet 300 reflects the light upward as the light is output downward from the bottom surface of the light guide plate 200.

The light emitting diodes 400 serve as a light source for generating the light. The light emitting diodes 400 are disposed at one side of the light guide plate 200. The light generated from the light emitting diodes 400 is incident into the light guide plate 200 through the side of the light guide plate 200.

The light emitting diodes 400 may include a blue light emitting diode generating the blue light or a UV light emitting diode generating the UV light. In detail, the light emitting diodes 400 may emit the blue light having the wavelength in the range of about 430 nm to about 470 nm or the UV light having the a wavelength in the range of about 300 nm to abut 400 nm.

The light emitting diodes 400 are mounted on the printed circuit board 401. The light emitting diodes 400 may be disposed under the printed circuit board 401. The light emitting diodes 400 are driven by receiving a driving signal through the printed circuit board 401.

The printed circuit board 401 is electrically connected to the light emitting diodes 400. The printed circuit board 401 may mount the light emitting diodes 400 thereon. The printed circuit board 401 is disposed in the bottom cover 100.

The light guide plate 200 is disposed in the bottom cover 100. The light guide plate 200 is disposed on the reflective sheet 100. The light guide plate 200 supplies light received from the light emitting diode 300 upward by reflecting, refracting and scattering the light.

The light guide plate 200 is disposed below the liquid crystal panel 200. The light guide plate 200 is disposed on the reflective sheet 300. The light guide plate 200 has a plate shape. The light guide plate 200 is transparent. For example, a material used for the light guide plate 200 may include an acrylic resin formed by methyl acrylate, ethyl acrylate, cyclohexyl acrylate, or benzene acrylate. For example, a guide part 210 may include polymer such as polymethylmethaacrylate (PMMA) or polycarbonate (PC). The light guide plate 200 may include glass. In detail, the glass used for the light guide plate 200 may include silicon oxide (SiO2), titanum oxide (TiO2), aluminum hydroxide (Al(OH)3), or Zinc oxide (ZnO). The light guide plate 200 may have a thickness in the range of about 0.5 mm to about 1.5 mm.

As shown in FIGS. 2 to 4, a plurality of scattering parts 210 is formed on the light guide plate 200. That is, the scattering parts 210 are formed on at least one surface of the light guide plate 200. The scattering parts 210 may change a path of incident light. That is, the scattering parts 210 may serve as a light path changing part for changing the path of the incident light. In detail, the scattering parts 210 may scatter the incident light. In more detail, the scattering parts 210 may scatter the incident light upward. The scattering parts 210 configure a scattered pattern on a top surface of the light guide plate 200.

The scattering parts 210 may be disposed on the top surface of the light guide plate 200. The scattering parts 210 may include protrusions which are formed on the top surface of the light guide plate 200. The scattering parts 210 may have a dot shape when viewed from a top side.

A diameter R1 of each of scattering parts 210 may be equal to or greater than about 90 μm. The diameter R1 of each scattering part 210 may be in the range of about 90 μm to about 300 μm. In detail, the diameter R1 of each scattering part 210 may be in the range of about 100 μm to about 300 μm. In more detail, the diameter R1 of each scattering part 210 may be in the range of about 150 μm to about 250 μm.

The scattering parts 210 are spaced apart from each other. In this case, a pitch P between the scattering parts 210 may be gradually reduced as the scattering parts 210 are located away from the light emitting diodes 400. That is, the scattering parts 210 may be densely disposed as the scattering parts 210 are located away from the light emitting diodes 400. Accordingly, the light guide plate 200 may uniformly supply light upward.

The scattering part 210 includes a scattering protrusion 211 and a scattering groove 212.

The scattering protrusion 211 may include a curved surface. A protruding part of the scattering protrusion 211 may have a curved surface as a whole. In detail, the scattering protrusion may have a semisphere shape. A diameter R2 of the scattering protrusion 211 may be in the range of about 80 μm to about 290 μm. A height of the scattering protrusion 211 may be in the range of about 40 μm to about 150 μm.

The scattering groove 212 may be formed on the top surface of the light guide plate 200. The scattering groove 212 may be adjacent to the scattering protrusion 211. In detail, the scattering groove 212 may surround the scattering protrusion 211. The scattering groove 212 may extend around the scattering protrusion 211. The scattering groove 212 may have a closed loop shape when viewed from the top side.

A width of each of the grooves 220 may be in the range of about 5 μm to about 10 μm. A depth of each of the grooves 220 may be in the range of about 2 μm to about 6 μm.

As shown in FIG. 5, the scattering parts 210 may be provided on a bottom surface of the light guide plate 200. That is, the scattering parts 210 may directly face the reflective sheet 300.

As shown in FIG. 6, the scattering parts 210 may be provided on both of top and bottom surfaces of the light guide plate 200.

As shown in FIGS. 7 and 8, a plurality of print scattering parts 220 may be provided in the light guide plate 200. The print scattering parts 220 may be printed on the top surface and/or the bottom surface of the light guide plate 200.

The print scattering parts 220 may directly provided on the top surface and/or the bottom surface of the light guide plate 200. The print scattering parts 220 may be a pattern protruding from at least one surface of the light guide plate 200, for example, the top surface and/or the bottom surface of the light guide plate 200. A diameter R3 of each of the print scattering parts 220 may be in the range of about 90 μm to about 300 μm. In detail, the diameter R3 of each of the print scattering parts 220 may be in the range of about 100 μm to about 300 μm. In more detail, the diameter R3 of each of the print scattering parts 220 may be in the range of about 150 μm to about 250 μm.

The print scattering parts 220 include a plurality of beads 221 and a printing part 222. The beads 221 may be transparent. The beads 221 may a high refractive index. The refractive index of the beads 221 may be in the range of about 1.6 to 2.2. The beads 221 may include aluminum oxide (Al2O3) or titanium oxide (TiO).

A diameter of each of the beads 221 may be in the range of about 50 nm to about 10 μm. In detail, the diameter of each of the beads 221 may be in the range of about 5 μm to about 10 μm.

The printing part 222 includes a transparent resin. The printing part 222 receives the beads 221. The beads 221 may be inserted into the printing part 222. The printing part 22 may bond the beads 22 to the top surface or the bottom surface of the light guide plate 200. The printing part 222 may have a relatively high refractive index. A refractive index of the printing part 222 may be in the range of 1.2 to 1.4.

If the print scattering part 220 is farther away from the light emitting diode 400, an area of each printing scattering part 220 may gradually be increased. That is, as the print scattering part 220 is farther away from the light emitting diode 400, the area of each printing scattering part 220 may gradually be increased. Accordingly, the print scattering part 220 is farther away from the light emitting diode 400, so reduction in intensity of the light may be compensated.

The optical sheets 500 are disposed on the light guide plate 200. The optical sheets 500 change or improve characteristics of light output from the top surface of the light guide plate 200 to supply the light to the liquid crystal panel 20.

The optical sheets 500 may include a light conversion sheet 501, a diffusion sheet 502, a first prism sheet 503, and a second prism sheet 504.

The light conversion sheet 501 may be disposed on a light path between the light source and the liquid crystal panel 20. For example, the light conversion sheet 501 may be disposed on the light guide plate 200. In detail, the light conversion sheet 501 may be interposed between the light guide plate 200 and the diffusion sheet 502. The light conversion sheet 501 may convert wavelength of incident light and supply the converted light upward.

For example, when the light emitting diodes 400 are blue light emitting diodes, the light conversion sheet 501 may convert blue light supplied upward from the light guide plate 200 into green light and red light. That is, the light conversion sheet 501 may convert a part of the blue light into green light having a wavelength in the range of about 520 nm to about 560 nm, and convert another part of the blue light into red light having a wavelength in the range of about 630 nm to about 660 nm.

When the light emitting diodes 400 are UV light emitting diodes, the light conversion sheet 501 may convert UV ray output from the top surface of the light guide plate 200 into blue light, green light, and red light. The light conversion sheet 501 may convert a part of the UV ray into blue light having a wavelength in the range of about 430 nm to about 470 nm, and convert another part of the UV ray into green light having a wavelength in the range of about 520 nm to about 560 nm, and convert a still another part of the UV ray into red light having a wavelength in the range of about 630 nm to about 660 nm.

Accordingly, light passing through the light conversion sheet 510 which is not converted and light converted by the light conversion sheet 501 form white light. That is, the blue light, the green light, and the red light are combined with each other so that the white light may be incident to the liquid crystal panel 20.

As shown in FIGS. 9 and 10, the light conversion sheet 501 includes a lower substrate 510, an upper substrate 520, a light conversion layer 530, a lower reflection preventing layer 540, and an upper reflection preventing layer 550.

The lower substrate 510 is disposed below the light conversion layer 530. The lower substrate 510 may be transparent and flexible. The lower substrate 510 may adhere to a bottom surface of the light conversion layer 530.

For example, a material use for the lower substrate 510 may include transparent polymer such as polyethyleneterephthalate (PET).

The upper substrate 520 is disposed on the light conversion layer 530. The upper substrate 520 may be transparent and flexible. The upper substrate 520 may adhere to the top surface of the light conversion layer 530.

For example, a material used for the upper substrate 520 may include transparent polymer such as PET.

The light conversion layer 530 is sandwiched between the lower substrate 510 and the upper substrate 520. The lower substrate 510 and the upper substrate 520 support the light conversion layer 530. The lower substrate 510 and the upper substrate 520 protect the light conversion layer 530 from external physical impact.

The lower substrate 510 and the upper substrate 520 have low oxygen permeability and low moisture permeability.

Thus, the lower substrate 510 and the upper substrate 520 can protect the light conversion layer 530 from external chemical impact by moisture and/or oxygen.

The light conversion layer 530 is interposed between the lower and upper substrates 510 and 520. The light conversion layer 530 may adhere to the top surface of the lower substrate 510, and adhere to the bottom surface of the upper substrate 520.

The light conversion layer 530 includes a plurality of light conversion particles 531 and a host layer 532.

The light conversion particles 531 are interposed between the lower and upper substrates 510 and 520. In more detail, the light conversion particles 531 are uniformly distributed in the host layer 532, and the host layer 532 is interposed between the lower substrate 510 and the upper substrate 520.

The light conversion particles 531 convert a wavelength of the light emitted from the light emitting diodes 400. In detail, the light conversion particles 531 receive light emitted from the light emitting diodes 400 to convert the a wavelength of the incident light. For instance, the light conversion particles 531 may convert the blue light emitted from the light emitting diodes 400 into the green light and the red light. That is, a part of the light conversion particles 531 may convert the blue light into green light having a wavelength in the range of about 520 nm to about 560 nm, and another part of the light conversion particles 531 may convert the blue light into red light having a wavelength in the range of about 630 nm to about 660 nm.

In addition, the light conversion particles 531 may convert the UV ray emitted from the light emitting diodes 400 into the blue light, the green light, and the red light. That is, a part of the light conversion particles 531 may convert the UV ray into blue light having a wavelength in the range of about 430 nm to about 470 nm, and another part of the light conversion particles 531 may convert the UV ray into green light having a wavelength in the range of about 520 nm to about 560 nm. Still another part of the light conversion particles 531 may convert the UV ray into red light having a wavelength in the range of about 630 nm to about 660 nm.

That is, when the light emitting diodes 400 are a blue light emitting diode 400 for generating blue light, light conversion particles 531 for converting the blue light into green light and red light, respectively may be used. In addition, when the light emitting diodes 400 are a blue light emitting diode 400 for generating the UV ray, light conversion particles 531 for converting the UV ray into blue light, green light, and red light, respectively may be used.

The light conversion particles 531 may include a plurality of quantum dots (QD). The quantum dots may include core nano-crystals and shell nano-crystals surrounding the core nano-crystals. In addition, the quantum dots may include organic ligands bonded to the shell nano-crystals. Further, the quantum dots may include an organic coating layer surrounding the shell nano-crystals.

The shell nano-crystals may be prepared as at least two layers. The shell nano-crystals are formed on the surface of the core nano-crystals. The quantum dots lengthen a wavelength of the light incident into the core nano-crystals by using the shell nano-crystals forming a shell layer, thereby improving the light efficiency.

The quantum dots may include at least one of a group-II compound semiconductor, a group-III compound semiconductor, a group-V compound semiconductor, and a group-VI compound semiconductor. In more detail, the core nano-crystals may include CdSe, InGaP, CdTe, CdS, ZnSe, ZnTe, ZnS, HgTe or HgS. In addition, the shell nano-crystals may include CuZnS, CdSe, CdTe, CdS, ZnSe, ZnTe, ZnS, HgTe or HgS. The quantum dot may have a diameter of about 1 nm to about 10 nm.

The wavelength of the light emitted from the quantum dots can be adjusted according to the size of the quantum dots. The organic ligand may include pyridine, mercapto alcohol, thiol, phosphine and phosphine oxide. The organic ligand may stabilize the unstable quantum dots after the synthesis process. Dangling bonds may be formed at the valence band and the quantum dots may be unstable due to the dangling bonds. However, since one end of the organic ligand is the non-bonding state, the one end of the organic ligand is bonded with the dangling bonds, thereby stabilizing the quantum dots.

In particular, if the size of the quantum dot is smaller than the Bohr radius of an exciton, which consists of an electron and a hole excited by light and electricity, the quantum confinement effect may occur, so that the quantum dot may have the discrete energy level. Thus, the size of the energy gap is changed. In addition, the charges are confined within the quantum dot, so that the light emitting efficiency can be improved.

Different from general fluorescent pigments, the fluorescent a wavelength of the quantum dot may vary depending on the size of the particles. In detail, the light has the shorter a wavelength as the size of the particle is reduced, so that the fluorescent light having the wavelength band of visible ray can be generated by adjusting the size of the particles. In addition, the quantum dot represents the extinction coefficient which is 100 to 1000 times higher than that of the general pigment and has the superior quantum yield as compared with the general pigment, so that strong fluorescent light can be generated.

The quantum dots can be synthesized through the chemical wet scheme. The chemical wet scheme is to grow the particles by immersing the precursor material in the organic solvent. According to the chemical wet scheme, the quantum dots can be synthesized.

The host layer 532 surrounds the light conversion particles 531. That is, the light conversion particles 531 are uniformly distributed in the host layer 532. The host layer 531 may include a polymer. The host layer 532 is transparent. That is, the host layer 532 may be formed by using a transparent polymer.

The host layer 532 is interposed between the lower and upper substrates 510 and 520. The host layer 532 may adhere to the top surface of the lower substrate 510 and the bottom surface of the upper substrate 520.

The sealing part 540 is disposed at the side of the light conversion layer 530. In detail, the sealing part 540 covers the side of the light conversion layer 530. In more detail, the sealing part 540 can also be disposed at the sides of the lower substrate 510 and the upper substrate 520. In this case, the sealing part 540 covers the sides of the lower substrate 510 and the upper substrate 520.

In addition, the sealing part 540 may be bonded to the sides of the light conversion layer 530, the lower substrate 510 and the upper substrate 520. In addition, the sealing part 540 may closely adhere to the sides of the light conversion layer 530, the lower substrate 510 and the upper substrate 520.

Therefore, the sealing part 540 can seal the side of the wavelength conversion layer 530. That is, the sealing part 540 may serve as a protective part for protecting the wavelength conversion layer 530 from the external chemical impact.

The liquid crystal panel 20 is disposed on the optical sheets 500. In addition, the liquid crystal panel 20 is disposed on the panel guide 23. The liquid crystal panel 20 may be guided by the panel guide 23.

The liquid crystal panel 20 displays images by adjusting intensity of light passing through the liquid crystal panel 20. In detail, the liquid crystal panel 20 is a display panel for displaying the images by using the light emitted from the backlight unit 10. The liquid crystal panel 20 includes a TFT substrate 21, a color filter substrate 22 and a liquid crystal layer interposed between the two substrates. In addition, the liquid crystal panel 20 includes polarizing filters.

Hereinafter, the TFT substrate 21 and the color filter substrate 22 will be described in detail although they are not shown in the drawings in detail. The TFT substrate 21 includes a plurality of gate lines and a plurality of data lines crossing the gate lines to define pixels and a thin film transistor (TFT) is provided at each cross section such that the thin film transistor TFT can be connected to a pixel electrode of the pixel in one-to-one correspondence. The color filter substrate 22 includes color filters having R, G and B colors corresponding to the pixels, a black matrix covering the gate lines, data lines and thin film transistors within the limit of the color filters, and a common electrode covering the above elements.

A driving PCB 25 is provided at an outer peripheral portion of the liquid crystal panel 210 to supply driving signals to the gate lines and data lines.

The driving PCB 25 is electrically connected to the liquid crystal panel 20 by a COF (chip on film) 24. The COF 24 may be replaced with a TCP (tape carrier package).

As described above, the liquid crystal display according to the embodiment disposes the light conversion member on the light guide plate 200 and the scattering parts 210 has a large diameter in the range of about 90 μm to about 300 μm. In this case, the light conversion member includes the light conversion particles. The light conversion particles may randomly change a light path while convert a wavelength of incident light. That is, the light conversion particles may also perform a scattering function.

Accordingly, even if the scattering parts 210 have a large diameter, because the light conversion member has the scattering function, the whole brightness uniformity is not reduced.

Therefore, the scattering parts 210 have a large diameter so that the whole brightness may be increased.

As a result, the display device according to the embodiment can represent improved brightness without reducing brightness uniformity.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Experimental Example

A light conversion sheet including a CdSe/ZnS quantum dot having a diameter of about 2 nm was disposed on a top surface of a light guide plate in which scattering parts having a diameter of about 150 μm were provided, and then light was emitted to a side of the light guide plate using a blue light emitting diode.

Comparative Example

Comparative Example is similar to Experimental Example except that the scattering parts having a diameter of about 25 μm were provided on the light guide plate.

Result

Brightness uniformity of the Experimental Example is substantially the same as that of the Comparative Example and brightness of the Experimental Example was improved by about 2% as compared with that of the Comparative Example.

The invention claimed is:

1. A display device comprising:
   a light source;
   a light guide part having a plate shape with a side surface and a top surface to guide light received from the light source at the side surface such that the light exits through the top surface of the light guide part;
   a scattering part to scatter light exiting from the top surface of the light guide part;
   a light conversion member provided over the light guide part and the scattering part, the scattering part being provided between the light guide part and the light conversion member; and
   a display panel over the light conversion member, wherein
   the scattering part is provided over the top surface of the light guide part, the scattering part including a plurality of beads, and the beads having a diameter in a range of 50 nm to 10 μm,
   the light conversion member includes a lower substrate, a light conversion layer on the lower substrate, and an upper substrate on the light conversion layer,
   the light conversion layer has a plurality of light conversion particles and a host layer, and
   the light conversion particles comprise a quantum dot (QD), and
   the beads are provided between the lower substrate of the light conversion member and the top surface of light guide part.

2. The display device of claim 1, wherein the scattering part includes at least one printed part, the beads being provided in the at least one printed part.

3. The display device of claim 1, wherein the scattering part include patterns based on a plurality of printed parts made from a transparent resin, the beads being dispersed inside the plurality of printed parts.

4. The display device of claim 3, wherein the plurality of printed parts have a diameter in a range of 90 to 300 micrometers.

5. The display device of claim 1, wherein the beads have a refractive index which is higher than a refractive index than the light guide part.

6. The display device of claim 1, wherein the refractive index of the beads is in a range of 1.6 to 2.2.

7. The display device of claim 1, wherein a refractive index of the light guide part is in a range of 1.2 to 1.4.

8. The display device of claim 1, wherein the light source is provided on a bottom side of the light guide part.

9. The display device of claim 1, wherein the bead is transparent.

10. The display device of claim 2, wherein a refractive index of the beads and the at least one printed part is different from each other.

11. The display device of claim 1, wherein a refractive index of the beads is different from a refractive index of the light guide part.

* * * * *